United States Patent
Suetsugu

(10) Patent No.: US 11,298,955 B2
(45) Date of Patent: Apr. 12, 2022

(54) LIQUID DISCHARGE APPARATUS, CONTROL METHOD, AND RECORDING MEDIUM

(71) Applicant: Yuri Suetsugu, Kanagawa (JP)

(72) Inventor: Yuri Suetsugu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 91 days.

(21) Appl. No.: 16/815,184

(22) Filed: Mar. 11, 2020

(65) Prior Publication Data

US 2020/0298585 A1     Sep. 24, 2020

(30) Foreign Application Priority Data

Mar. 19, 2019    (JP) .............. JP2019-051909

(51) Int. Cl.
*B41J 2/21*      (2006.01)
*B41J 2/045*     (2006.01)
*B41J 25/308*    (2006.01)
*G06K 15/10*     (2006.01)

(52) U.S. Cl.
CPC ......... *B41J 2/2132* (2013.01); *B41J 2/04501* (2013.01); *B41J 25/308* (2013.01); *G06K 15/105* (2013.01)

(58) Field of Classification Search
CPC ...... B41J 2/2132; B41J 2/2135; B41J 29/393; B41J 2/04558; B41J 2/04505
See application file for complete search history.

(56) References Cited

U.S. PATENT DOCUMENTS 10,218,878 B2    2/2019  Tsukada

FOREIGN PATENT DOCUMENTS

| JP | 2002-264315 | 9/2002 | |
| JP | 2005-088467 | 4/2005 | |
| JP | 2017-047608 | 3/2017 | |
| WO | WO-2010054963 A1 * | 5/2010 | ............ B41J 25/001 |

* cited by examiner

*Primary Examiner* — Julian D Huffman
(74) *Attorney, Agent, or Firm* — Harness, Dickey & Pierce, P.L.C.

(57) ABSTRACT

A liquid discharge apparatus according to an embodiment of the present disclosure includes: a memory; a hardware processor coupled to the memory and configured to scan a carriage having a liquid discharge head in a main-scanning direction and control discharge of liquid from the liquid discharge head; a roller rotated by a motor to convey a medium in a sub-scanning direction; and an image sensor configured to image a liquid discharged portion on the medium. The hardware processor shifts channels of the liquid discharge head on which discharge of liquid is valid, depending on thickness of stripe-like density unevenness detected by the image sensor.

10 Claims, 14 Drawing Sheets

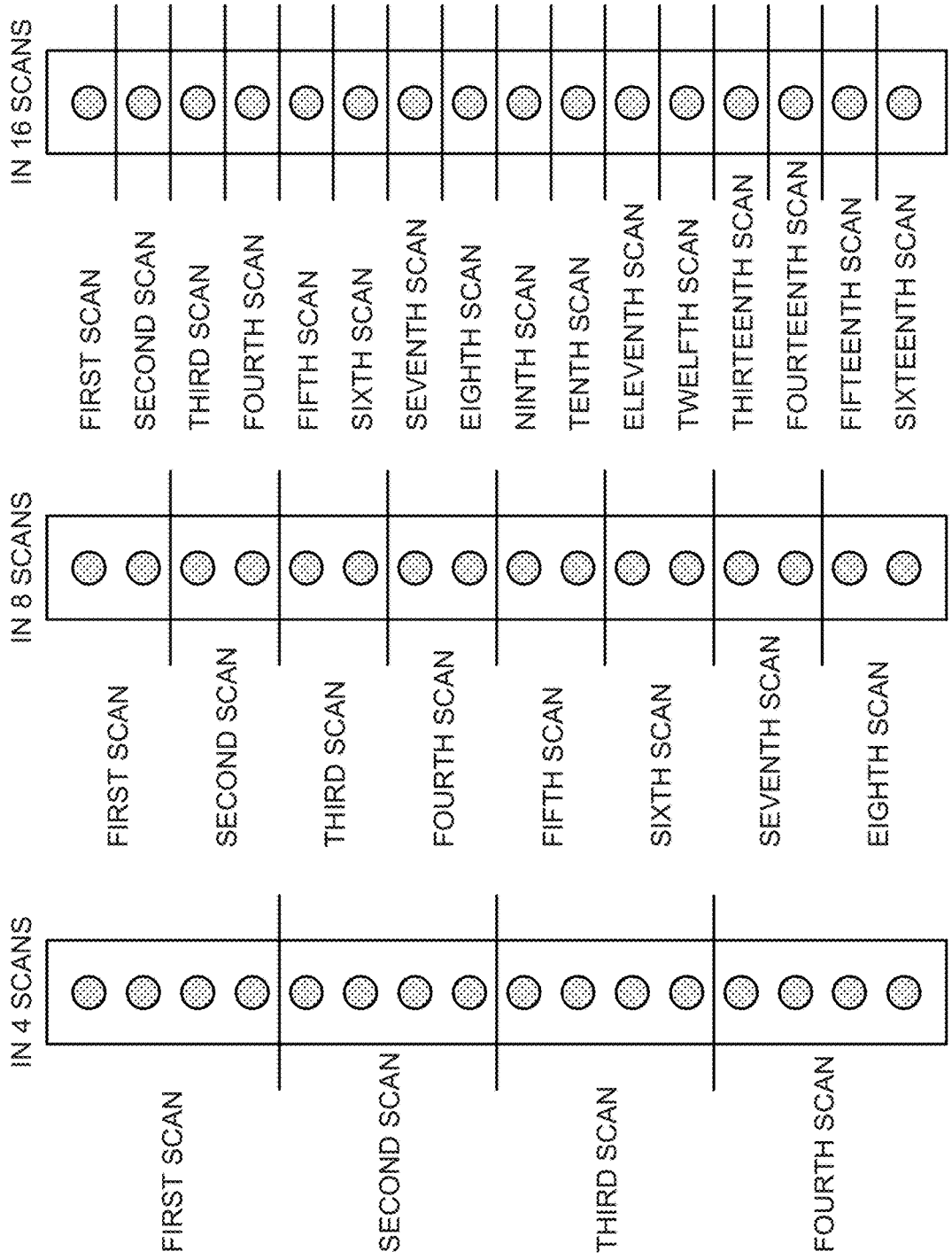

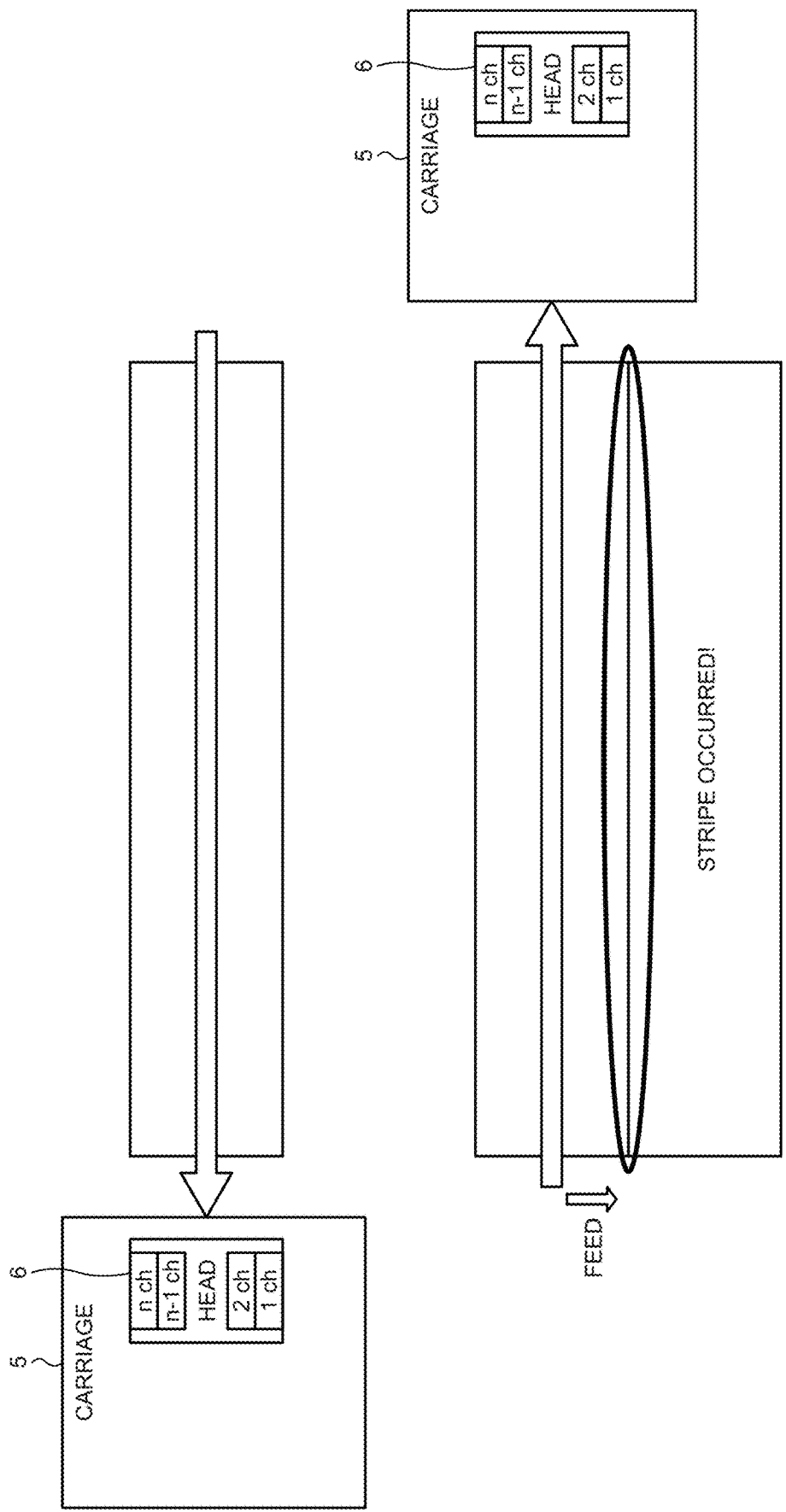

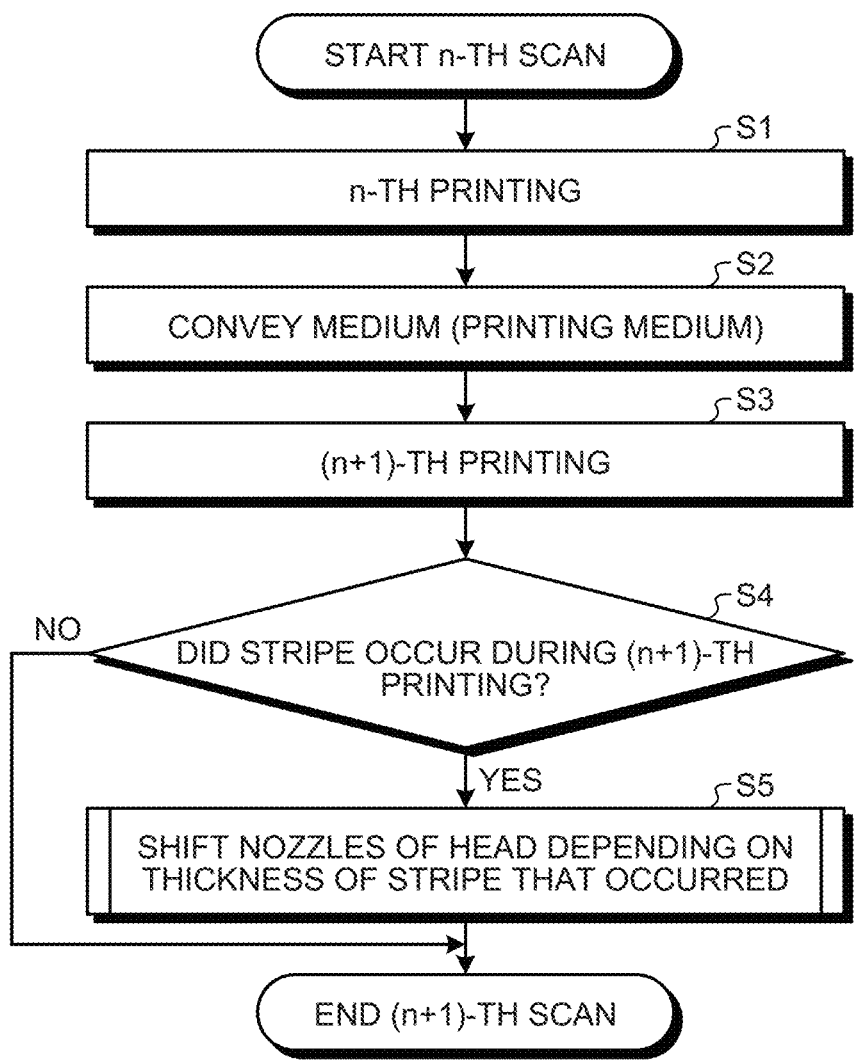

LIQUID DISCHARGE APPARATUS, CONTROL METHOD, AND RECORDING MEDIUM

CROSS-REFERENCE TO RELATED APPLICATIONS

The present application claims priority under 35 U.S.C. § 119 to Japanese Patent Application No. 2019-051909, filed on Mar. 19, 2019. The contents of which are incorporated herein by reference in their entirety.

BACKGROUND OF THE INVENTION

1. Field of the Invention

The present invention relates to a liquid discharge apparatus, a control method, and a recording medium.

2. Description of the Related Art

Conventionally, with an inkjet printer as one example, a liquid discharge apparatus that includes a liquid discharge head or a liquid discharge unit and drives the liquid discharge head to discharge liquid has been known.

As one example of printing, after a medium, such as paper, is fed by a predetermined distance in a sub-scanning direction and stopped, a carriage having the liquid discharge head is moved in a main-scanning direction, and discharge of liquid is performed. Those actions are repeated.

In this case, when feed of the medium includes an error, overlapping or a blank may appear between a trailing edge of a printed portion by a previous scan (scanning) and a leading edge of the printed portion by the current scan, and stripe-like density unevenness may occur.

Meanwhile, by using an image sensor, methods for correcting density unevenness have been disclosed (for example, see Japanese Patent Application Publication No. 2017-47608, and others).

With the conventional techniques, however, it has been difficult to mitigate the stripe-like density unevenness attributable to an error in the feed of the medium.

SUMMARY OF THE INVENTION

A liquid discharge apparatus according to one aspect of the present invention includes: a memory; a hardware processor coupled to the memory and configured to scan a carriage having a liquid discharge head in a main-scanning direction and control discharge of liquid from the liquid discharge head; a roller rotated by a motor to convey a medium in a sub-scanning direction; and an image sensor configured to image a liquid discharged portion on the medium. The hardware processor shifts channels of the liquid discharge head on which discharge of liquid is valid, depending on thickness of stripe-like density unevenness detected by the image sensor.

A control method according to another aspect of the present invention is implemented by a computer as a liquid discharge apparatus including a hardware processor to scan a carriage having a liquid discharge head in a main-scanning direction and control discharge of liquid from the liquid discharge head, a roller rotated by a motor to convey a medium in a sub-scanning direction, and an image sensor to image a liquid discharged portion. The control method includes: acquiring an imaging result of the image sensor; and shifting channels of the liquid discharge head on which discharge of liquid is valid, depending on thickness of stripe-like density unevenness detected based on the imaging result.

A non-transitory computer-readable recording medium according to another aspect of the present invention is a recording medium on which an executable program is recorded, the program being executed by a computer as a liquid discharge apparatus including a hardware processor to scan a carriage having a liquid discharge head in a main-scanning direction and control discharge of liquid from the liquid discharge head, a roller rotated by a motor to convey a medium in a sub-scanning direction, and an image sensor to image a liquid discharged portion. The program instructs the computer to: acquire an imaging result of the image sensor; and shift channels of the liquid discharge head on which discharge of liquid is valid, depending on thickness of stripe-like density unevenness detected based on the imaging result.

BRIEF DESCRIPTION OF THE DRAWINGS

FIG. 1 is a perspective view illustrating the inside of a liquid discharge apparatus seen through;

FIG. 5 is a diagram illustrating an example of discharge nozzle selections;

FIG. 7 is a diagram illustrating an example of an image printed by the scan of an outward path and by the scan of a return path;

FIG. 8 is a flowchart (1) illustrating a processing example of scans;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENT

Figure 1:
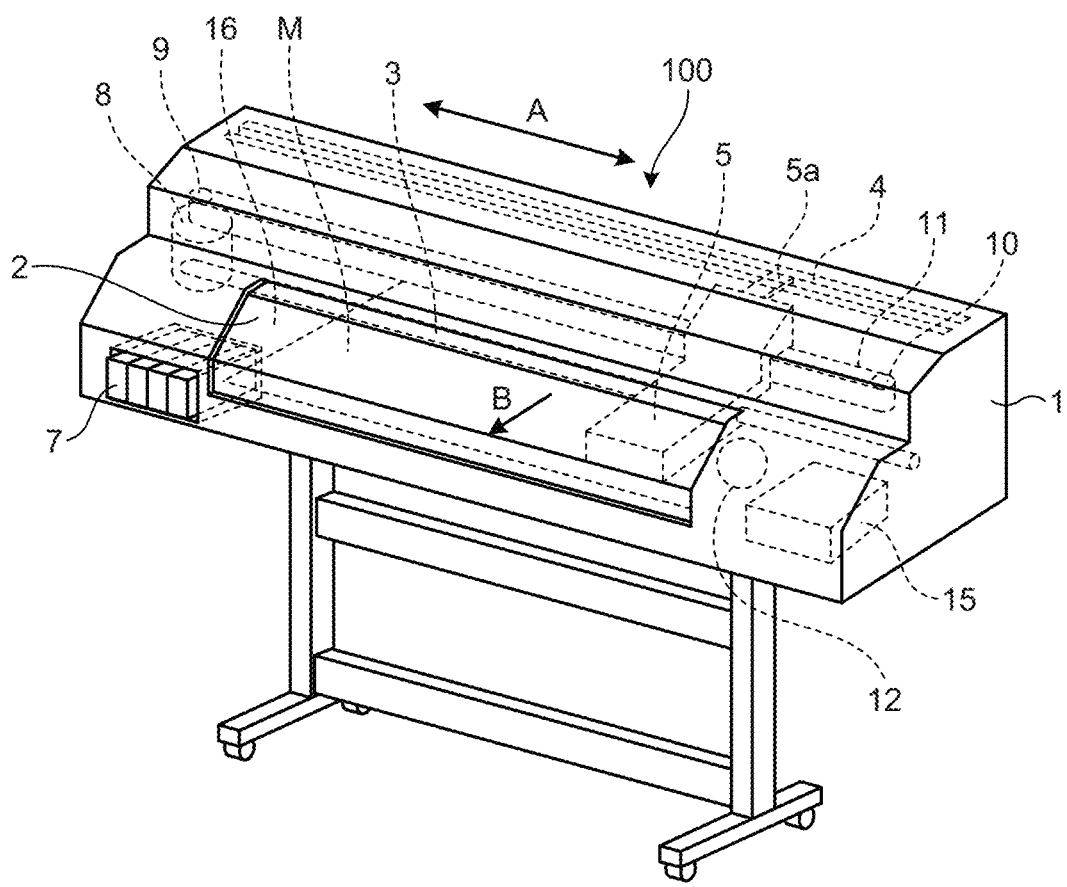

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of the present invention is to mitigate the stripe-like density unevenness caused by an error in the feed of the medium.

With reference to the accompanying drawings, an exemplary embodiment of a liquid discharge apparatus, a control method, and a recording medium will be described in detail.

Mechanical Configuration of Liquid Discharge Apparatus

Figure 2:
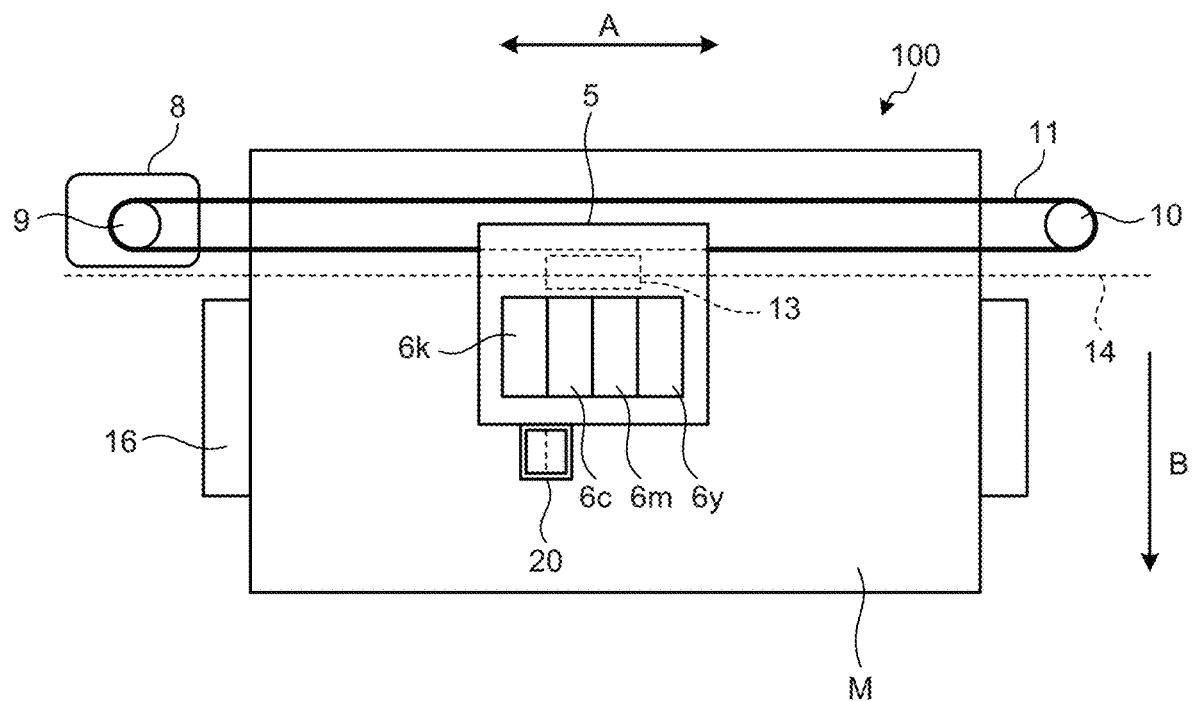
FIG. 2 is a top view illustrating a mechanical configuration of the inside of the liquid discharge apparatus.

First, with reference to FIG. 1 and FIG. 2, a mechanical configuration of a liquid discharge apparatus 100 of the present embodiment will be described. FIG. 1 is a perspective view illustrating the inside of the liquid discharge apparatus 100 seen through. FIG. 2 is a top view illustrating a mechanical configuration of the inside of the liquid discharge apparatus 100.

As illustrated in FIG. 1, the liquid discharge apparatus 100 of the present embodiment includes a carriage 5 that reciprocates in a main-scanning direction (a direction indicated by an arrow A in FIG. 1). The carriage 5 is supported by a main guide rod 3 extending along the main-scanning direction. On the carriage 5, a coupling piece 5a is provided. The coupling piece 5a is engaged with a sub-guide member 4 provided in parallel with the main guide rod 3 and stabilizes the position of the carriage 5.

On the carriage 5, as illustrated in FIG. 2, a recording head 6y that discharges a yellow ink, a recording head 6m that discharges a magenta ink, a recording head 6c that discharges a cyan ink, and a recording head 6k that discharges a black ink are installed (hereinafter, the recording heads 6y, 6m, 6c, and 6k are collectively referred to as "recording head 6"). The recording head 6 is installed on the carriage 5 so that the discharge surface (nozzle surface) thereof faces downward (on the side of a medium M such as recording paper).

Referring back to FIG. 1, cartridges 7 that are ink supply bodies for supplying ink to the recording head 6 are not installed on the carriage 5 but are arranged at a predetermined position in the liquid discharge apparatus 100. The cartridges 7 and the recording head 6 are coupled by pipes, and the ink is supplied to the recording head 6 from the cartridges 7 via those pipes.

The carriage 5 is coupled to a timing belt 11 extended between a drive pulley 9 and a driven pulley 10. The drive pulley 9 rotates by the drive of a main-scanning motor 8. The driven pulley 10 has a mechanism that adjusts the distance between the drive pulley 9 and the driven pulley 10 and serves to exert a predetermined tension on the timing belt 11.

The carriage 5 reciprocates in the main-scan direction, as feed operation of the timing belt 11 is performed by the drive of the main-scanning motor 8. The move of the carriage 5 in the main-scanning direction is, as illustrated in FIG. 2 for example, controlled on the basis of an encoder value that is obtainable as an encoder sensor 13 provided on the carriage 5 detects a mark of an encoder sheet 14.

In FIG. 1, the liquid discharge apparatus 100 of the present embodiment includes a maintenance mechanism 15 for maintaining the reliability of the recording head 6. The maintenance mechanism 15 performs cleaning and capping of the discharge surface of the recording head 6, ejection of unnecessary ink from the recording head 6, and the like.

A platen 16 is provided at the position opposite to the discharge surface of the recording head 6. The platen 16 is provided for supporting the medium M when the ink is discharged onto the medium M from the recording head 6. The liquid discharge apparatus 100 of the present embodiment is a wide machine whose carriage 5 has a long moving distance in the main-scanning direction. Thus, the platen 16 is constituted by joining a plurality of plate-like members in the main-scanning direction (a moving direction of the carriage 5). The medium M is clamped by a conveyance roller 12 driven by a sub-scanning motor to rotate and is intermittently conveyed in the sub-scanning direction (an arrow B direction in FIG. 1) on the platen 16.

The above-described various constituent elements constituting the liquid discharge apparatus 100 of the present embodiment are arranged in the inside of an exterior body 1. The exterior body 1 is provided with a cover member 2 that can be opened and closed. At the time of maintenance of the liquid discharge apparatus 100 or at the time of the occurrence of a paper jam, by opening the cover member 2, work can be performed on each constituent element provided inside the exterior body 1.

The liquid discharge apparatus 100 of the present embodiment intermittently conveys the medium M on the platen 16 in the sub-scanning direction. While the conveyance of the medium M in the sub-scanning direction is halted, the liquid discharge apparatus 100 moves the carriage 5 in the main-scanning direction and discharges ink on the medium M on the platen 16 from a nozzle row of the recording head 6 installed on the carriage 5, thereby forming an image on the medium M.

The liquid discharge apparatus 100 of the present embodiment includes a two-dimensional image sensor 20 having a function of capturing an image of a color measurement pattern formed on the medium M and calculating color measurement values. The two-dimensional image sensor 20, as illustrated in FIG. 2, is supported on the carriage 5 on which the recording head 6 is installed and moves integrally with the carriage 5. Then, the two-dimensional image sensor 20 moves over the medium M, on which the color measurement pattern is formed, by the conveyance of the medium M and the move of the carriage 5 and, when arriving at the position opposite to the color measurement pattern, captures an image. The two-dimensional image sensor 20 then calculates, based on the RGB values of the color measurement pattern obtained by the imaging, the color measurement values of the color measurement pattern. In the present embodiment, separately from such a purpose, the two-dimensional image sensor 20 is used for detecting the occurrence of stripe-like density unevenness at the time of printing. The mounting position of the two-dimensional image sensor 20 is discretionary depending on the product configuration.

Figure 3:
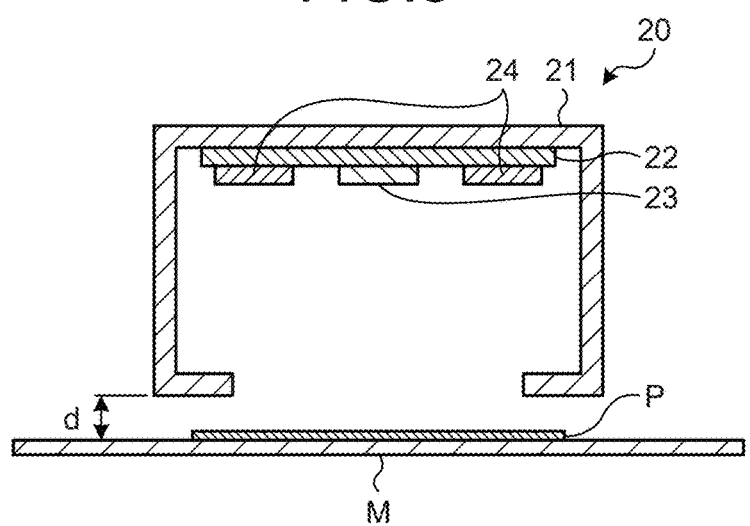
FIG. 3 is a cross-sectional view illustrating a configuration example of a two-dimensional image sensor.

FIG. 3 is a cross-sectional view illustrating a configuration example of the two-dimensional image sensor 20. In FIG. 3, a sensor control substrate 22, on which a sensor unit 23 such as a charge-coupled device (CCD) or a complementary metal-oxide semiconductor (CMOS) is mounted, is fixed to a frame body 21. The frame body 21 is arranged to have a clearance of gap d with the medium M such as paper, and is movable over the medium M while maintaining the gap d with the medium M. On the sensor control substrate 22, an illumination light source 24 such as an LED system is installed and emits light at the time of imaging a printed area by the sensor unit 23. In the case of a configuration in which the light outside the apparatus falls on the outside of the frame body 21, the lighting conditions of an imaging target and a reference chart need to be as identical as possible. Specifically, in order to limit the illumination only to the light source fixed to the frame body 21 as much as possible, it is configured such that no light from the outside of the apparatus hits on the imaging target. In this case, it is preferable that the gap d be as small as possible. However, considering the flatness of the medium M, there is a need to ensure the size in which the frame body 21 makes no contact with the medium M. The gap d is normally configured to be an extent of 1 mm to 2 mm, for example. However, the medium M with high stiffness may be lifted and, in order to prevent the medium M from damaging the two-dimensional image sensor 20, such a mechanism is provided that raises and lowers the carriage 5 so as to make it possible to increase the gap d. With this mechanism, it is possible to handle the thick medium M as well.

Figure 4:
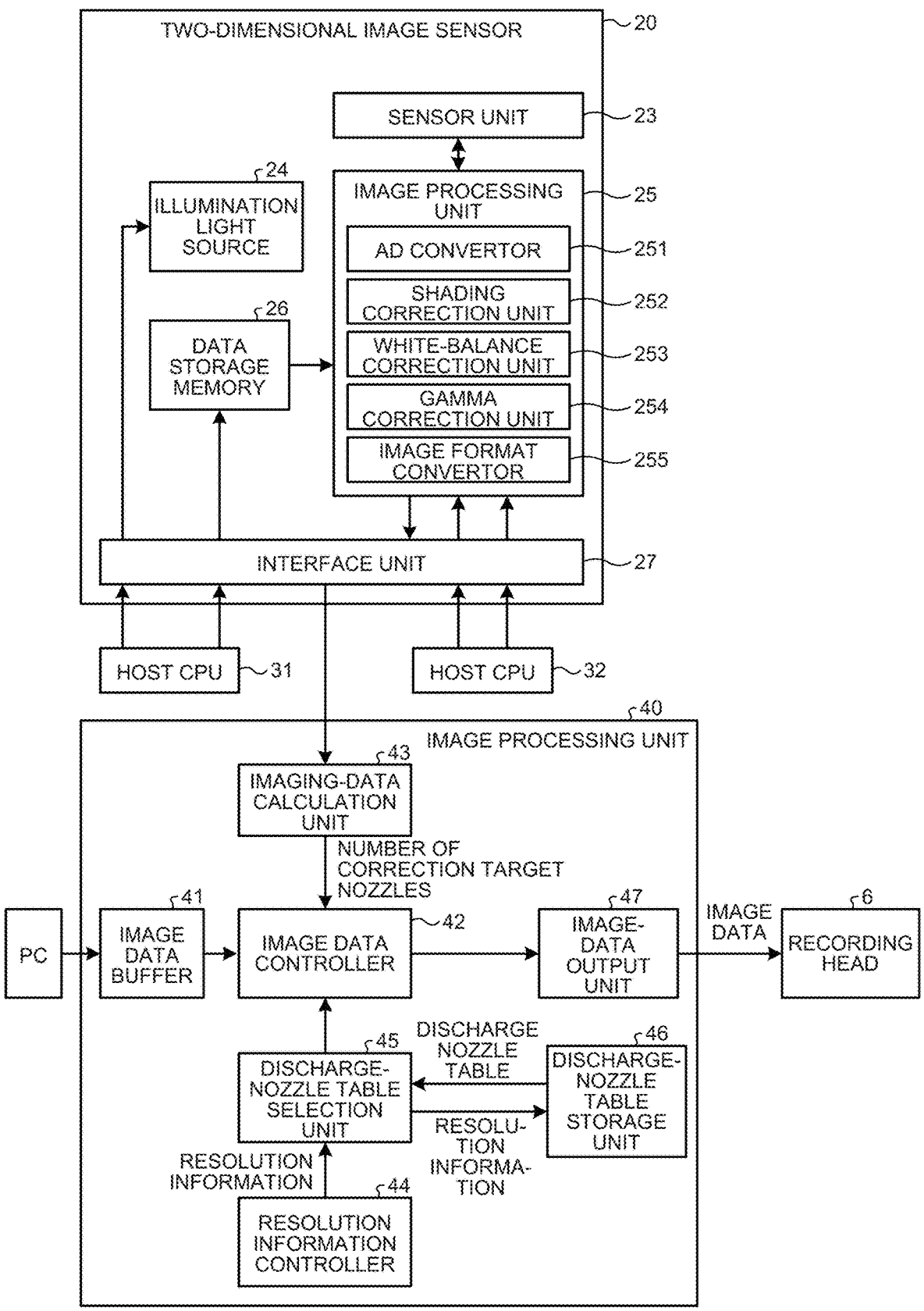
FIG. 4 is a block diagram illustrating a configuration example of the two-dimensional image sensor and an image processing unit.

FIG. 4 is a block diagram illustrating a configuration example of the two-dimensional image sensor 20 and an image processing unit 40. In FIG. 4, the two-dimensional image sensor 20 is provided with the sensor unit 23, the illumination light source 24, an image processing unit 25, a data storage memory 26, and an interface unit 27. The image processing unit 25 is provided with an AD converter 251, a shading correction unit 252, a white-balance correction unit 253, a gamma correction unit 254, and an image format converter 255. The AD converter 251 performs AD (analog/digital) conversion on an analog signal output from the sensor unit 23. The shading correction unit 252 corrects sensitivity variations of the sensor imaging pixels and illumination unevenness. The white-balance correction unit 253 corrects fluctuation in the amount of light of the illumination. The gamma correction unit 254 corrects the linearity of sensitivity. The image format converter 255 converts digital image data into any desired image format. The data storage memory 26 stores images captured by the sensor unit 23, which are used for detection of a stripe-like pattern by host CPUs 31 and 32 via the interface unit 27.

The image processing unit 40 is provided with an image data buffer 41, an image data controller 42, an imaging-data calculation unit 43, a resolution information controller 44, a discharge-nozzle table selection unit 45, a discharge-nozzle table storage unit 46, and an image-data output unit 47. The image processing unit 40 may be constituted by a computer including a central processing unit (CPU), a read-only memory (ROM), a random access memory (RAM), and the like, or may be constituted of a circuit, for example.

The image data buffer 41 stores image data that has been rendered and transmitted from a PC. When a print command is output from the PC, the image data buffer 41 transmits the stored image data to the image data controller 42.

The imaging-data calculation unit 43 receives data that was imaged at the time of the scan from the two-dimensional image sensor 20. The imaging-data calculation unit 43 determines the number of correction target nozzles depending on the thickness of stripe-like density unevenness from the content of imaging, and transmits it to the image data controller 42.

The discharge-nozzle table storage unit 46 stores a table of discharge nozzles for each number of scans. At the time of image forming by an inkjet printing device, discharge nozzles are selected based on the number of scans at the time of printing. FIG. 5 is a diagram illustrating an example of discharge nozzle selection. In the case of the recording head with 16 nozzles per a row, the number of nozzles needed for each scan is determined by dividing 16 nozzles by the number of scans. In the case of four scans, four nozzles per one scan are needed, in the case of eight scans, two nozzles per one scan are needed, and in the case of 16 scans, one nozzle per one scan is needed. An address of a nozzle for identifying the nozzle is called a channel. Assuming that printing is performed with four scans by the head having 320 nozzles, printing channels are selected to discharge the first scan by 1 to 80 channels, the second scan by 81 to 160 channels, the third scan by 161 to 240 channels, and the fourth scan by 241 to 320 channels. As described above, the selection of the discharge nozzles for each number of scans is made by the discharge nozzle table.

Referring back to FIG. 4, the discharge-nozzle table selection unit 45 reads out, based on the number of scans acquired by the resolution information controller 44, the table from the discharge-nozzle table storage unit 46 and transmits data of the discharge nozzle table to the image data controller 42.

The image data controller 42 generates image data to be transmitted to the recording head 6 based on: the image data transmitted from the image data buffer 41; the number of correction target nozzles transmitted from the imaging-data calculation unit 43; and the data of the discharge nozzle table transmitted from the discharge-nozzle table selection unit 45. The image data controller 42 transmits the generated image data to the image-data output unit 47. In the generated image data, discharge for the number of nozzles, which is calculated by the imaging-data calculation unit 43 from the upper nozzle of the table, is fine-driven.

The image-data output unit 47 transmits the image data to the recording head 6 and allows the recording head 6 to discharge the ink. The nozzle that is fine-driven in the image data does not discharge the ink.

In the present embodiment, the data of the imaging-data calculation unit 43 is transmitted to the image data controller 42 and the correction is performed in the image data controller 42. Alternatively, the correction can be implemented by transmitting the data to the PC instead of the image data controller 42, and by changing the image data for the number of correction target nozzles on the PC and performing the rendering again.

Stripe-Like Density Unevenness

The liquid discharge apparatus 100 conveys the medium by the sub-scanning motor. When the feed length of the medium is greater than an expected value or smaller than the expected value, the image printed on the medium is affected and the image quality is deteriorated.

Figure 6A:
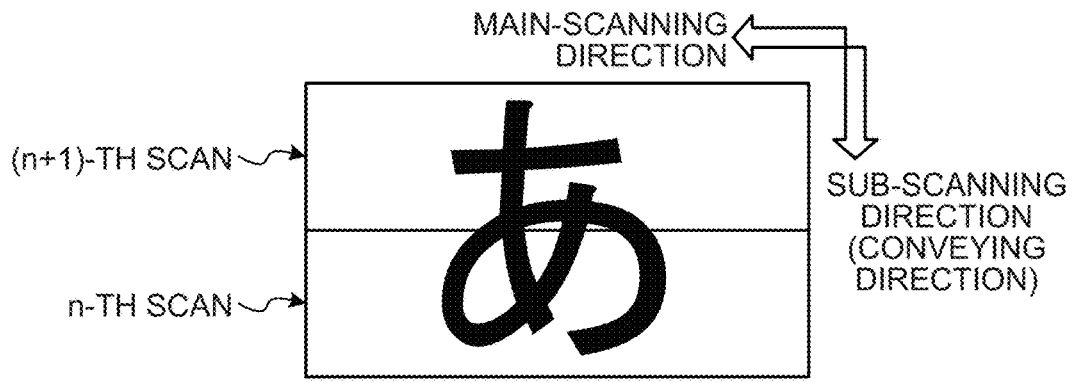
FIG. 6A is a diagram (1) illustrating an example of an image printed by the n-th scan and the (n+1)-th scan.

FIG. 6A is a diagram illustrating an example of an image printed by the n-th scan and the (n+1)-th scan and is an example for which the feed length of the medium is substantially the expected value. In this case, the trailing edge (upper side) of the image by the n-th scan successfully connects to the leading edge (lower side) by the (n+1)-th scan. Thus, no stripe-like density unevenness occurs.

Figure 6B:
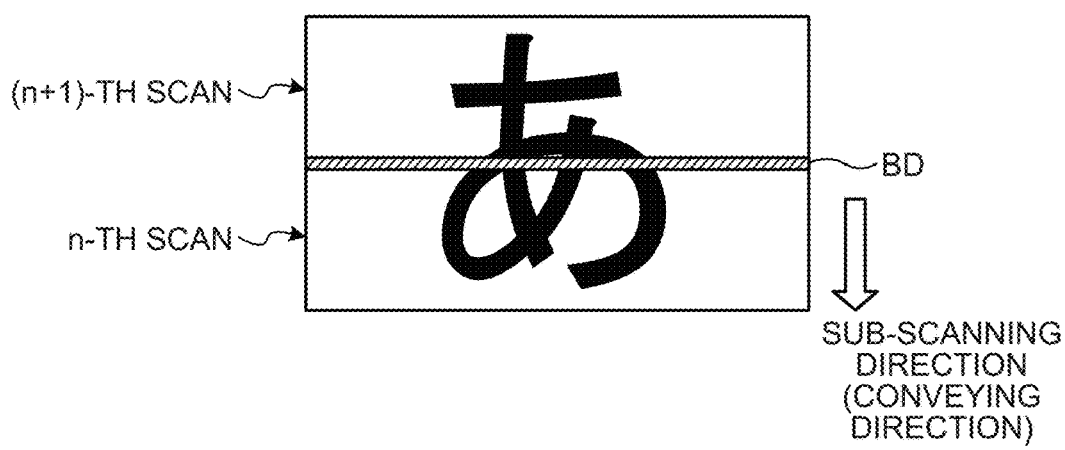
FIG. 6B is a diagram (2) illustrating an example of an image printed by the n-th scan and the (n+1)-th scan.

FIG. 6B illustrates an example for which the feed length of the medium is smaller than the expected value. In this case, the trailing edge (upper side) of the image by the n-th scan overlaps with the leading edge (lower side) by the (n+1)-th scan. As a result, a banding BD that is stripe-like density unevenness occurs.

Figure 6C:
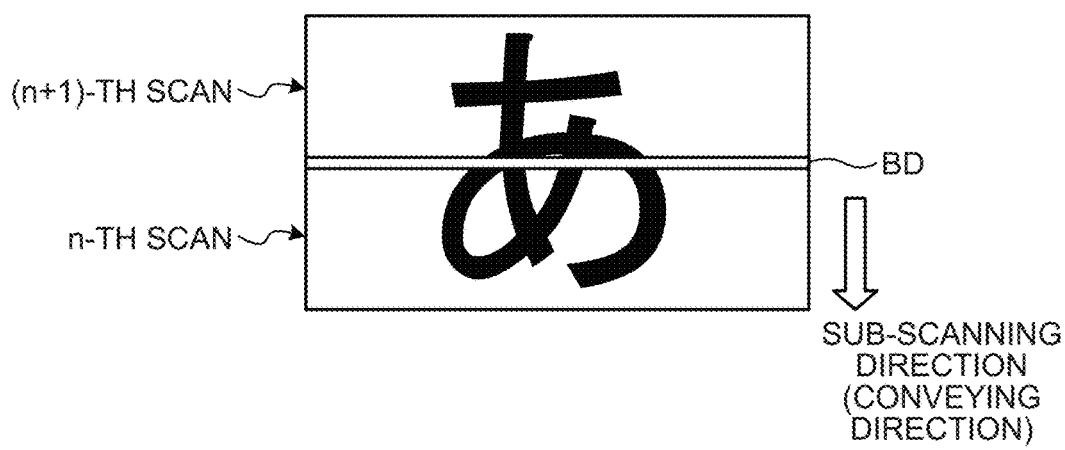
FIG. 6C is a diagram (3) illustrating an example of an image printed by the n-th scan and the (n+1)-th scan.

FIG. 6C is an example for which the feed length of the medium is greater than the expected value. In this case, a clearance between the trailing edge (upper side) of the image by the n-th scan and the leading edge (lower side) by the (n+1)-th scan arises. As a result, the substrate of the medium is exposed, and the banding BD occurs. As described above, when an error in the feed length of the medium arises, stripe-like density unevenness occurs.

FIG. 7 is a diagram illustrating an example of an image printed by the scan of an outward path and by the scan of a return path. In FIG. 7, the upper portion illustrates a state in which the recording head 6 of the carriage 5 moves, at the n-th scan, in the left direction from the right edge and prints. The lower portion illustrates a state in which the recording head 6 of the carriage 5 moves, at the (n+1)-th scan, in the right direction from the left edge and prints. At this time, when an error in the feed length of the medium arises, then stripe-like density unevenness occurs.

Control Processing Example

FIG. 8 is a flowchart illustrating a processing example of scans. In FIG. 8, when starting the n-th scan, the liquid discharge apparatus 100 performs the n-th printing (Step S1), conveys the medium (a printing medium) (Step S2), and performs the (n+1)-th printing (Step S3). The two-dimensional image sensor 20 images a pattern that is being printed during the (n+1)-th printing.

Subsequently, the image processing unit 40 determines whether a stripe occurred during the (n+1)-th printing (Step S4). When it is determined that a stripe occurred (Yes at Step S4), the image processing unit 40 determines the number of shifting nozzles depending on the thickness of the stripe that occurred, and shifts the nozzles of the head (Step S5). The number of shifting nozzles increases in proportion to the thickness of the stripe-like density unevenness that has occurred. Then, the (n+1)-th scan is ended. When it is determined that no stripe occurred (No at Step S4), the (n+1)-th scan is ended.

Figure 9:
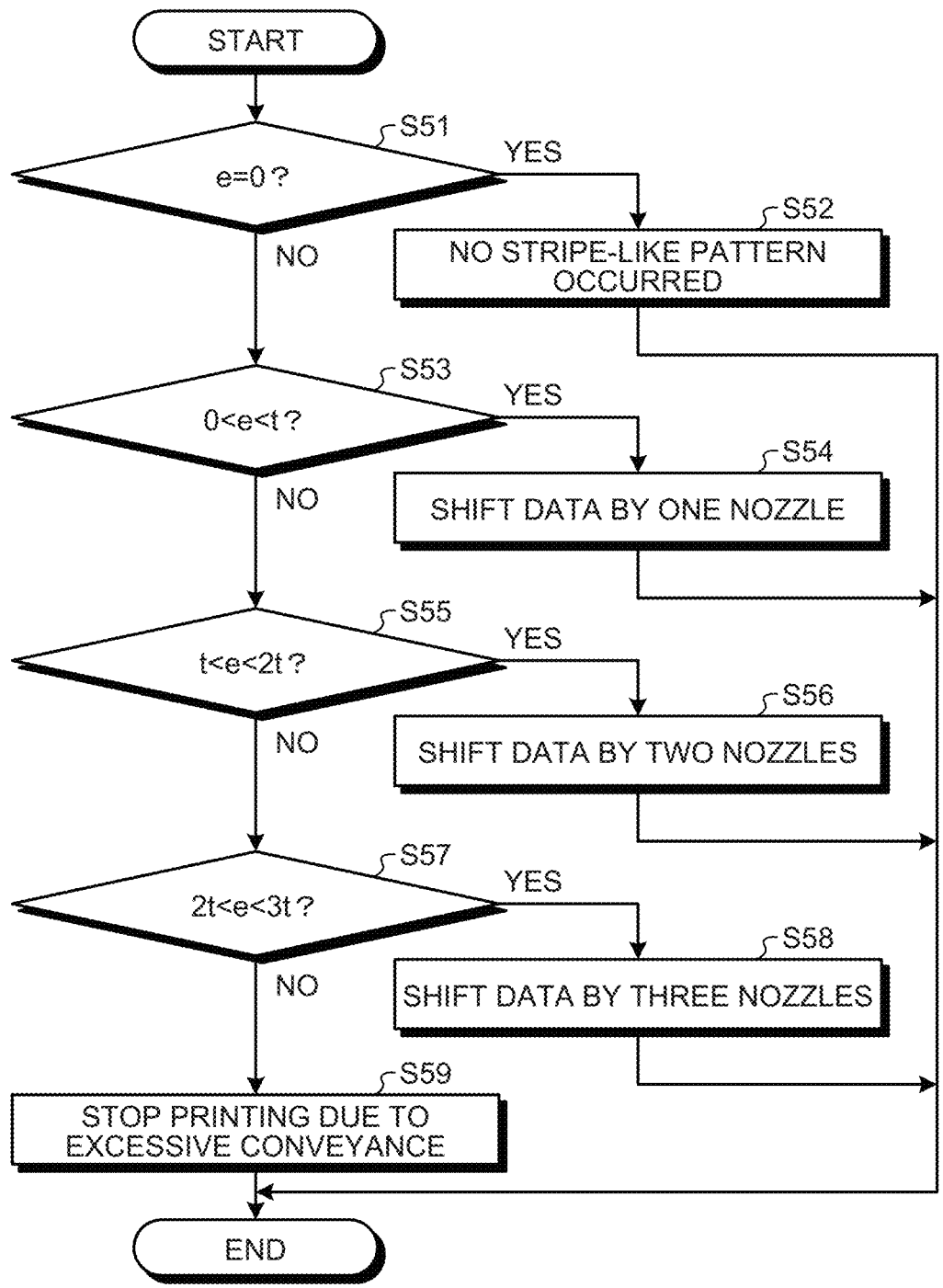
FIG. 9 is a flowchart (2) illustrating a processing example of a scan.

FIG. 9 is a processing example of Step S5 in FIG. 8. In FIG. 9, when starting the processing, the image processing unit 40 determines whether the thickness e of the stripe-like density unevenness in the sub-scanning direction is zero (zero considering the tolerance) (Step S51). When the image processing unit 40 determines that the thickness e is zero (Yes at Step S51), it is determined that no stripe-like pattern has occurred (Step S52), and the processing is ended.

On the other hand, when it is determined that the thickness e is not zero (No at Step S51), the image processing unit 40 determines whether the thickness e is greater than zero and is smaller than the dot diameter t that is discharged from the recording head (Step S53). When it is determined that the thickness e is greater than zero and is smaller than the dot diameter t (Yes at Step S53), the image processing unit 40 determines to shift the data by one nozzle (Step S54), and ends the processing.

When it is determined that the thickness e is greater than zero and is not smaller than the dot diameter t (No at Step S53), the image processing unit 40 determines whether the thickness e is greater than the dot diameter t and is smaller than twice the dot diameter t discharged from the recording head (Step S55). When it is determined that the thickness e is greater than the dot diameter t and is smaller than twice the dot diameter t (Yes at Step S55), the image processing unit 40 determines to shift the data by two nozzles (Step S56), and ends the processing.

When it is determined that the thickness e is greater than the dot diameter t and is not smaller than twice the dot diameter t (No at Step S55), the image processing unit 40 determines whether the thickness e is greater than twice the dot diameter t and is smaller than three times the dot diameter t discharged from the recording head (Step S57). When it is determined that the thickness e is greater than twice the dot diameter t and is smaller than three times the dot diameter t (Yes at Step S57), the image processing unit 40 determines to shift the data by three nozzles (Step S58), and ends the processing.

When it is determined that the thickness e is greater than twice the dot diameter t and is not smaller than three times the dot diameter t (No at Step S57), the image processing unit 40 stops printing due to excessive conveyance (Step S59), and ends the processing. This is an example in which x is the number of discharge nozzles by one scan in the selected discharge nozzle table and x=3. When the thickness e of the stripe-like pattern exceeds the x times the dot diameter t, the printing is stopped because the deviation of the feed length exceeds the thickness of the pattern that can be printed in one scan.

The processing of FIG. 8 and FIG. 9 is implemented by a computer program executed in the image processing unit 40 of the liquid discharge apparatus 100, for example. The computer program is provided by being embedded in a ROM or the like in advance, for example. The computer program may be recorded and provided in a file of an installable or executable format on a computer-readable recording medium such as a CD-ROM, a flexible disk (FD), a CD-R, and a digital versatile disc (DVD). Moreover, the computer program may be stored in a computer connected to a network such as the Internet and be provided by downloading via the network. The computer program may be provided or distributed via a network such as the Internet. The computer program has a modular configuration including the above-described image processing unit 40 or its constituent elements (the image data buffer 41, the image data controller 42, the imaging-data calculation unit 43, the resolution information controller 44, the discharge-nozzle table selection unit 45, the discharge-nozzle table storage unit 46, the image-data output unit 47, and the like). As the actual hardware, a CPU (hardware processor) reads out to execute the computer program from the above-described ROM, so as to load the above-described various units on a main storage device, and generates thereon the image processing unit 40, the image data buffer 41, the image data controller 42, the imaging-data calculation unit 43, the resolution information controller 44, the discharge-nozzle table selection unit 45, the discharge-nozzle table storage unit 46, the image-data output unit 47, and the like.

Figure 10:
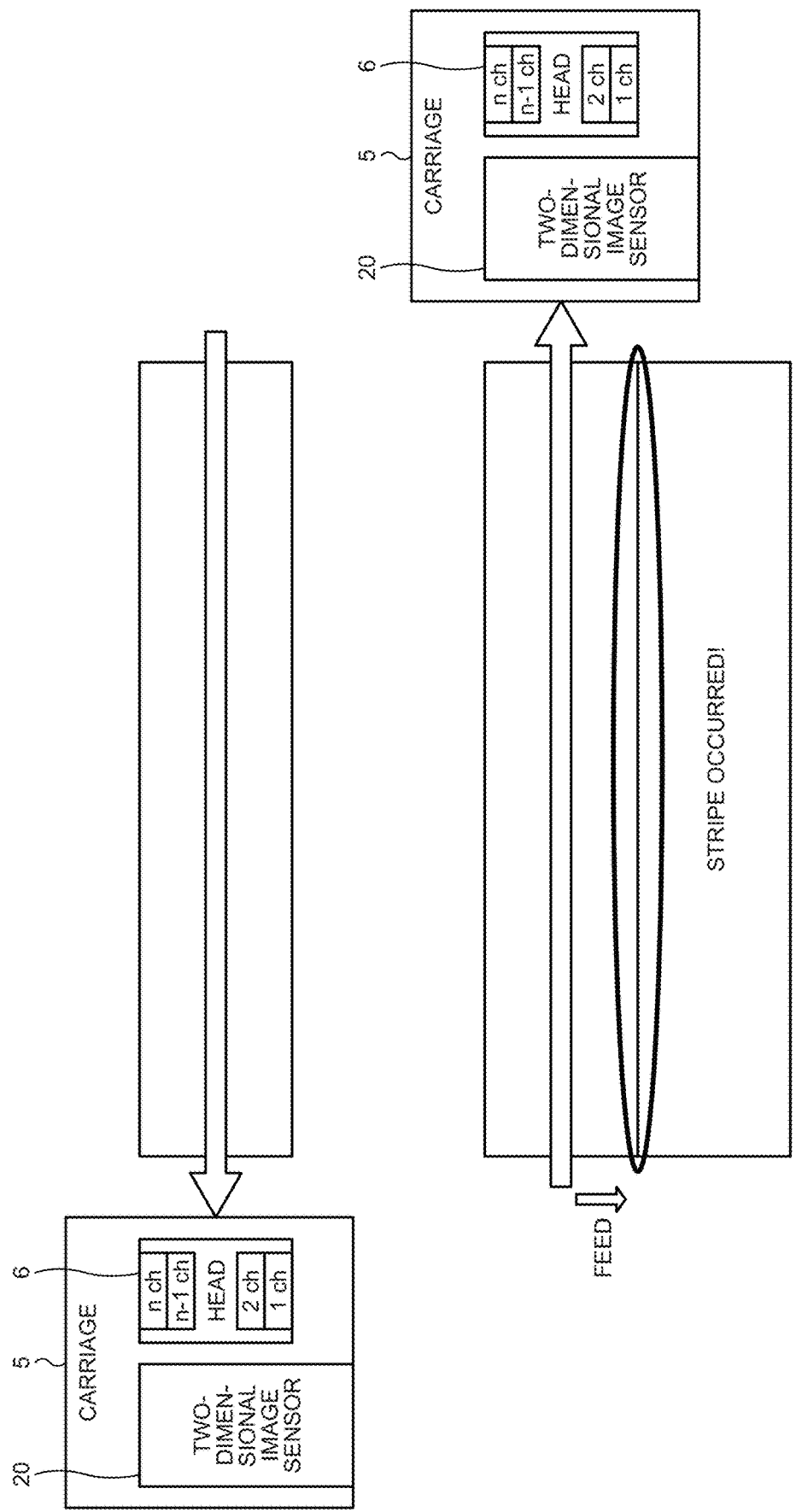
FIG. 10 is a diagram illustrating a state in which a stripe for which printing of an outward path and printing of a return path overlap occurred.

FIG. 10 is a diagram illustrating a state in which a stripe occurs when printing of an outward path and printing of a return path overlap. That is, the upper portion illustrates a state in which the recording head 6 of the carriage 5 moves, at the n-th scan, in the left direction from the right edge and prints. The lower portion illustrates a state in which the recording head 6 of the carriage 5 moves, at the (n+1)-th scan, in the right direction from the left edge and prints. In this case, the occurrence of stripe-like density unevenness has been detected by the two-dimensional image sensor 20. The detection of stripe-like density unevenness by the two-dimensional image sensor 20 can be made to perform only in the printing of the return path (move toward the right direction from the left edge of FIG. 10).

Figure 11:
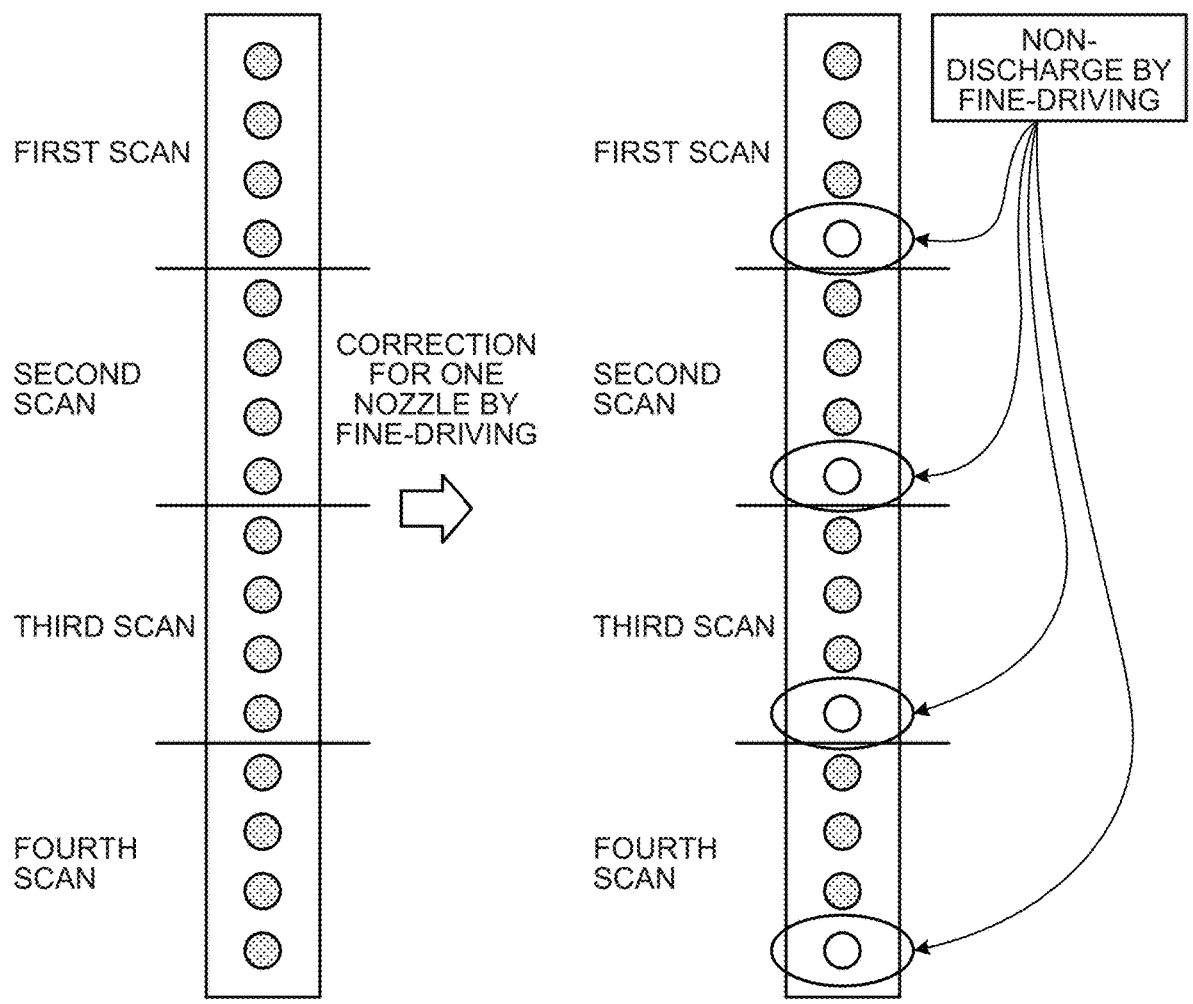
FIG. 11 is a diagram illustrating an example in which correction by one nozzle portion was made by fine-driving.

FIG. 11 is a diagram illustrating an example in which the correction by one nozzle was made by fine-driving. Each nozzle at the lower end of the first to the fourth scans is made non-discharge by fine-driving, and the other nozzles are made valid in discharge.

Figure 12:
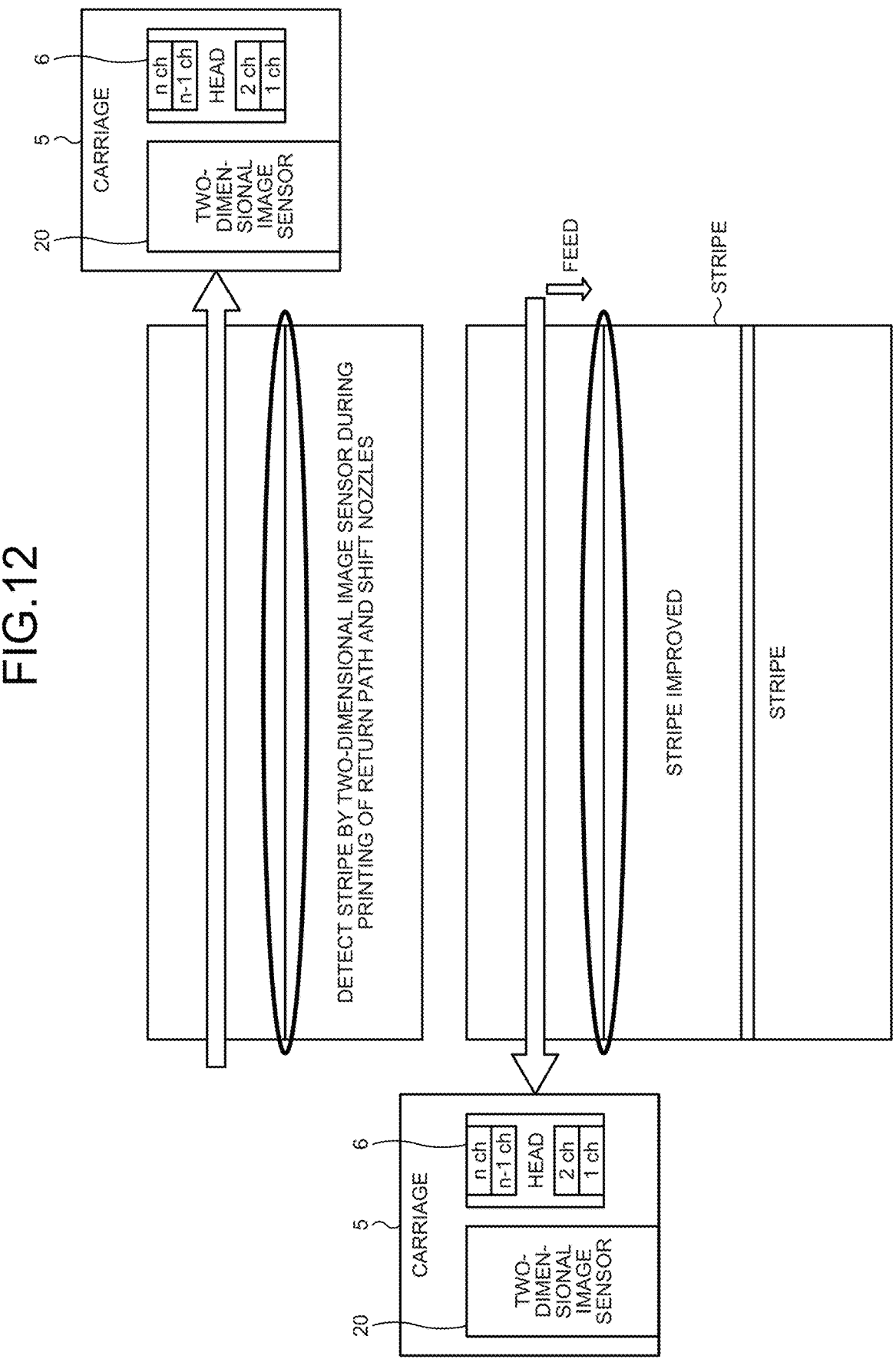
FIG. 12 is a diagram illustrating a state in which a stripe was improved in the printing of a return path after detecting a stripe.

FIG. 12 is a diagram illustrating a state in which a stripe has been improved in the printing of the return path after detecting a stripe. That is, the upper portion of FIG. 12 illustrates a state in which the recording head 6 of the carriage 5 moves, at the (n+1)-th scan, in the right direction from the left edge and prints. The lower portion of FIG. 12 illustrates a state in which, after conveying the medium, the recording head 6 of the carriage 5 moves, at the next scan, in the left direction from the right edge and prints, and illustrates that the stripe-like density unevenness has been mitigated by the fine-driving of the nozzle.

Figure 13:
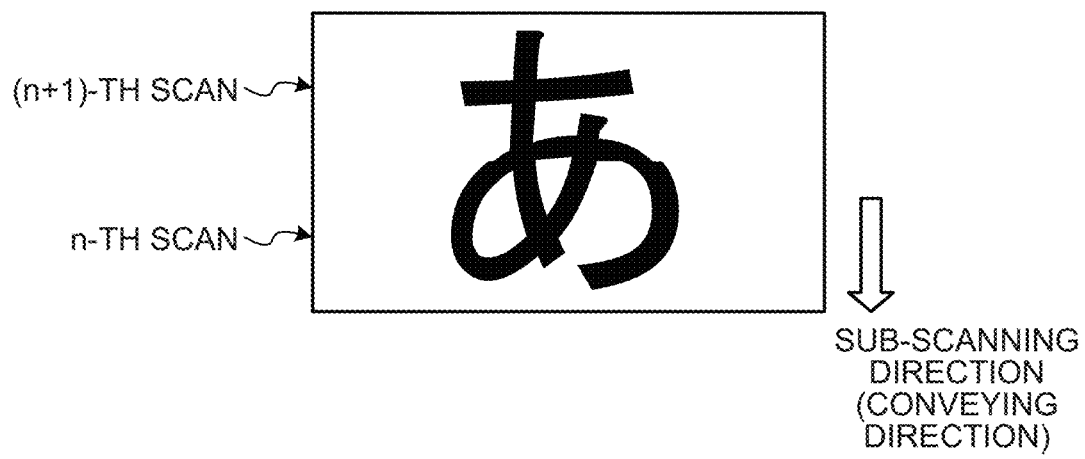
FIG. 13 is a diagram illustrating an example of the improvement of the stripe.

FIG. 13 is a diagram illustrating an example of improvement of the stripe and illustrates that the stripe-like density unevenness between the n-th scan and the (n+1)-th scan has been mitigated.

Figure 14A:
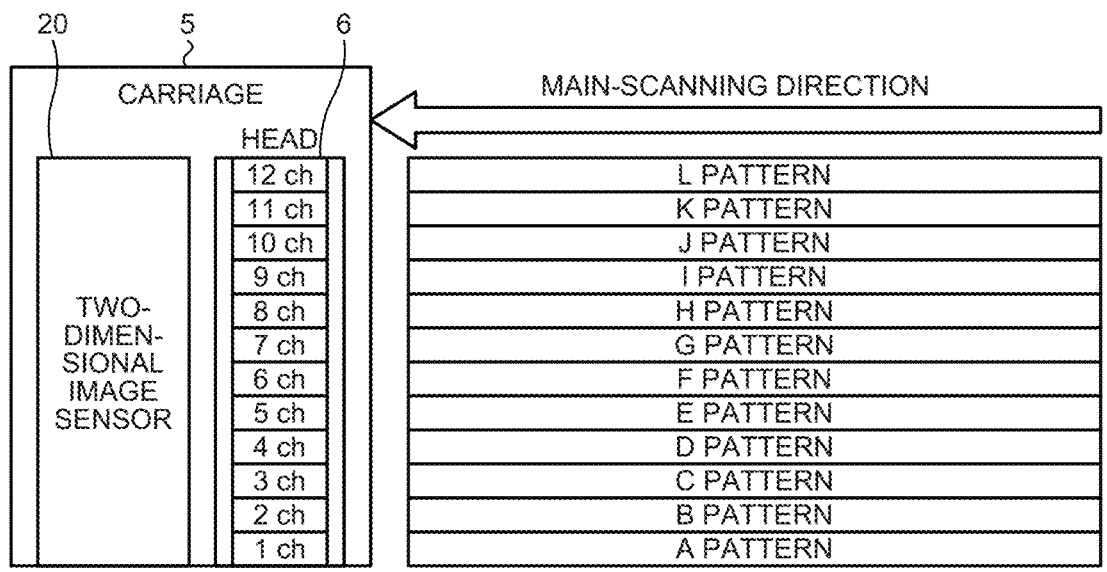
FIG. 14A is a diagram (1) illustrating an example of a pattern assigned to a recording head.
Figure 14B:
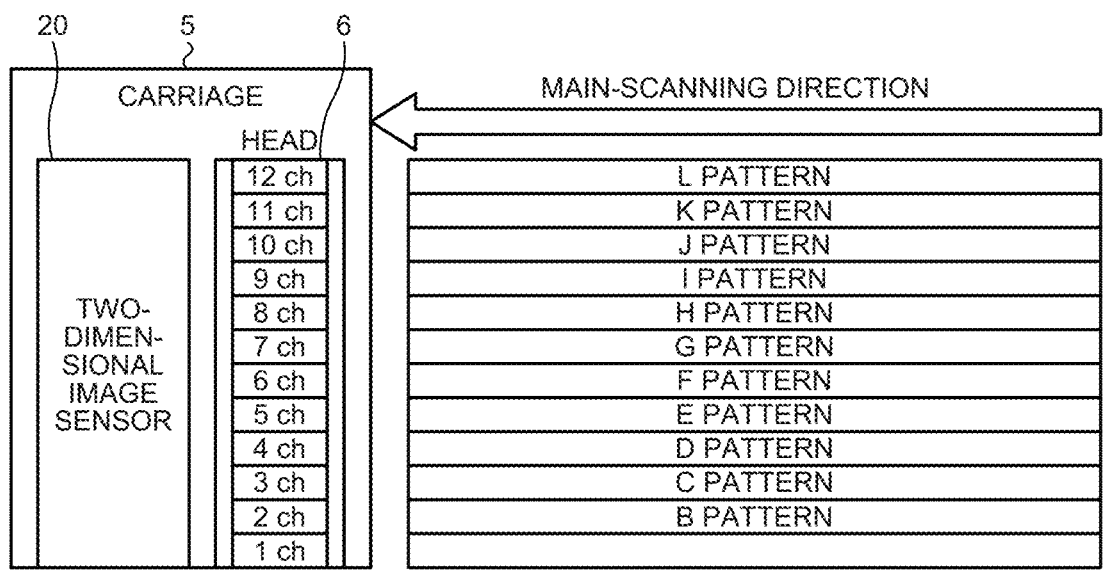
FIG. 14B is a diagram (2) illustrating an example of a pattern assigned to the recording head.
Figure 14C:
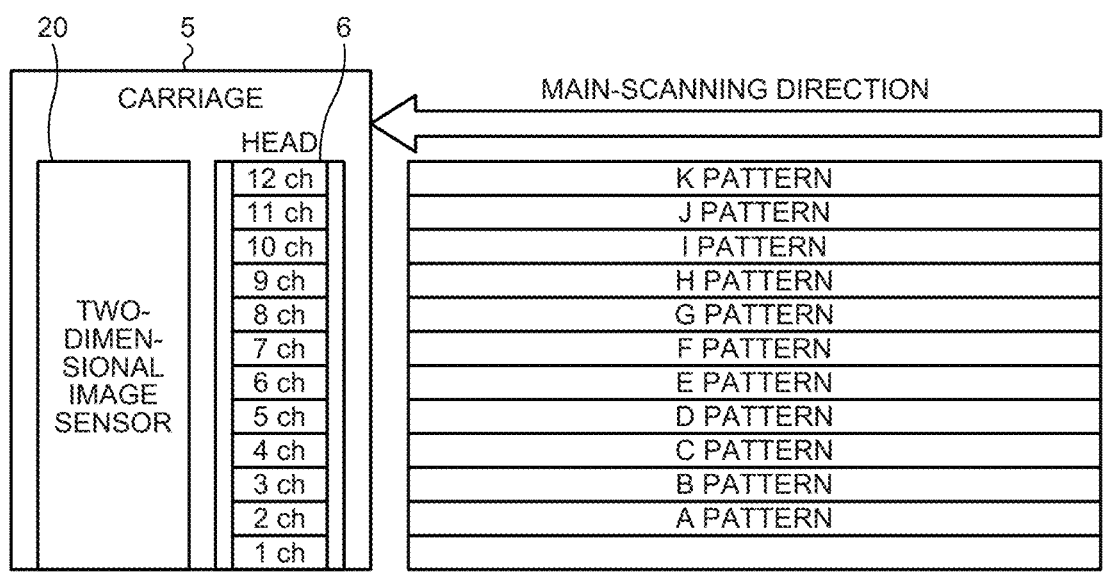
FIG. 14C is a diagram (3) illustrating an example of a pattern assigned to the recording head.

FIG. 14A to FIG. 14C are diagrams illustrating examples of a pattern assigned to the recording head 6. FIG. 14A illustrates a state in which no shifting in print data is performed. The print data of A pattern to L pattern are assigned to 1ch to 12ch of the recording head 6, respectively. In FIG. 14B, although the shifting of the print data is not performed, the 1ch of the recording head 6 is made non-discharge by not assigning the A pattern of the print data. For the 1ch, it may be made non-discharge by fine driving and the like after assigning the A pattern.

FIG. 14C illustrates a state in which the shifting in the print data by one nozzle was performed. While the print data of the A pattern to K pattern are assigned to the 2ch to 12ch of the recording head 6, respectively, the print data is not assigned to the 1ch. In this case, for the 1ch, even if it is not made non-discharge by fine-driving, it can be made non-discharge because no print data is present.

The foregoing description relates to the case in which the stripe-like density unevenness occurs due to overlap of the printed portion at the n-th scan and the printed portion at the (n+1)-th scan when the feed of the medium is small. Moreover, by reserving channels that are made non-discharge in a normal condition on the leading edge side of the liquid discharge head and shifting the effective range of discharge to those reserved channels, it is also possible to deal with the stripe-like density unevenness that occurs due to a large feed of the medium.

As in the foregoing, by shifting, based on the imaging result of the image sensor, the channels of the liquid discharge head on which discharge of liquid is valid depending on the thickness of the detected stripe-like density unevenness, it is possible to mitigate the stripe-like density unevenness due to an error in the feed of the medium.

In the foregoing, although the liquid discharge apparatus is exemplified by an inkjet printer, the embodiments are not limited thereto.

The liquid discharge apparatus according the present disclosure can include modules for feeding, conveying, and paper ejection of those to which liquid can attach, and also include pretreatment equipment, post-processing equipment, and the like.

Examples of the liquid discharge apparatus include: an image forming apparatus that prints an image on paper by discharging ink; and a solid molding apparatus (a three-dimensional molding apparatus) that discharges molding liquid on a powder bed for which the powder is formed into layers in order to mold a solid modeled object (a three-dimensional modeled object).

The liquid discharge apparatus is not limited to those that visualize significant images such as letters, shapes, and the like by the discharged liquid. For example, those that form a pattern and the like that itself has no meaning and those that form a three-dimensional image are also included.

The expression "those to which liquid can attach" described above are those to which liquid can attach at least temporarily, and that means those to which liquid can attach and adhere, those to which liquid can attach and permeate, and the like. Specific examples are media such as recording media such as paper, recording paper, recording sheet, film, and fiber, electronic components such as electronic substrates and piezoelectric elements, powder beds (dust layers), organ models, inspection cells, and the like, and unless otherwise noted, include all materials to which liquid attaches.

The material of "those to which liquid can attach" described above only needs to be material to which liquid can attach even temporarily such as paper, yarn, fiber, cloth, leather, metal, plastic, glass, wood, ceramics, and the like.

Furthermore, "liquid" only needs to have viscosity and surface tension that can be discharged from the head, and is not particularly limited. However, it is preferable that the viscosity be less than 30 mPa·s at ordinary temperature and ordinary pressure, or by heating or cooling. More specifically, it is a solution, suspension, emulsion, and the like that includes: solvents such as water and organic solvents; colorants such as dyes and pigments; function-imparting materials such as polymerizable compounds, resin, and surfactant; biocompatible materials such as DNA, amino acids, protein, and calcium; and edible materials such as natural dyes, and the like. Those materials can be used in applications such as an inkjet ink, a surface treatment liquid, a liquid for forming constituent elements of electronic elements and light-emitting elements and resist patterns of electronic circuits, and a material liquid for three-dimensional molding, for example.

Examples of the energy-generating source to discharge liquid include those using a piezoelectric actuator (laminated piezoelectric element and thin-film piezoelectric element), a thermal actuator that uses a thermoelectric conversion element such as a heat element, an electrostatic actuator that includes a diaphragm and a counter electrode, and the like.

The liquid discharge apparatuses include apparatuses in which a liquid discharge head relatively moves with respect to those to which liquid can attach, but are not limited thereto. Specific examples include serial-type apparatuses that move the liquid discharge head, line-type apparatuses that do not move the liquid discharge head, or the like.

Examples of the liquid discharge apparatuses further include a process liquid applicator that discharges a process liquid onto a form to apply the process liquid on the surface of the form for the purpose of reforming the surface thereof, a prilling granulator that jets out via a nozzle a composition liquid in which raw material is dispersed in a solution and granulates fine particles of the raw material, and the like.

In the present application, image forming, recording, printing, imprinting, presswork, molding, and the like are all synonymous.

According to the present invention, it is possible to mitigate stripe-like density unevenness due to an error in the feed of medium.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A liquid discharge apparatus comprising:
   a memory;
   a hardware processor coupled to the memory and configured to scan a carriage having a liquid discharge head in a main-scanning direction and control discharge of liquid from the liquid discharge head;
   a roller rotated by a motor to convey a medium in a sub-scanning direction; and
   an image sensor configured to image a liquid discharged portion on the medium,
   wherein the hardware processor shifts channels of the liquid discharge head on which discharge of liquid is valid, depending on a thickness of a stripe-like density unevenness of the liquid discharged portion between a first liquid discharge and a second liquid discharge detected by the image sensor, the second liquid discharge being a liquid discharge immediately after the first liquid discharge.

2. The liquid discharge apparatus according to claim 1, wherein the image sensor is mounted on the carriage and is arranged in parallel with the liquid discharge head.

3. The liquid discharge apparatus according to claim 1, wherein a reading portion of the image sensor is arranged at a head end portion in the sub-scanning direction.

4. The liquid discharge apparatus according to claim 1, wherein the hardware processor halts discharge of liquid from one or more nozzle channels at an end of the liquid discharge head, depending on thickness of detected stripe-like density unevenness.

5. The liquid discharge apparatus according to claim 1, wherein the hardware processor assigns no data to one or more nozzle channels at an end of the liquid discharge head, depending on thickness of detected stripe-like density unevenness.

6. The liquid discharge apparatus according to claim 1, wherein the image sensor is configured to image the liquid discharged portion on the medium on an outward path and a return path of the liquid discharge head.

7. A control method implemented by a computer as a liquid discharge apparatus including a hardware processor to scan a carriage having a liquid discharge head in a main-scanning direction and control discharge of liquid from the liquid discharge head, a roller rotated by a motor to convey a medium in a sub-scanning direction, and an image sensor to image a liquid discharged portion, the control method comprising:
   acquiring an imaging result of the image sensor; and
   shifting channels of the liquid discharge head on which discharge of liquid is valid, depending on a thickness of a stripe-like density unevenness of the liquid discharged portion between a first liquid discharge and a second liquid discharge detected by the image sensor, the second liquid discharge being a liquid discharge immediately after the first liquid discharge.

8. The liquid discharge apparatus according to claim 7, wherein the image sensor is configured to image the liquid discharged portion on an outward path and a return path of the liquid discharge head.

9. A non-transitory computer-readable recording medium on which an executable program is recorded, the program being executed by a computer as a liquid discharge apparatus including a hardware processor to scan a carriage having a liquid discharge head in a main-scanning direction and control discharge of liquid from the liquid discharge head, a roller rotated by a motor to convey a medium in a sub-scanning direction, and an image sensor to image a liquid discharged portion, the program instructing the computer to:
   acquire an imaging result of the image sensor; and
   shift channels of the liquid discharge head on which discharge of liquid is valid, depending on a thickness of a stripe-like density unevenness of the liquid discharged portion between a first liquid discharge and a second liquid discharge detected by the image sensor, the second liquid discharge being a liquid discharge immediately after the first liquid discharge.

10. The liquid discharge apparatus according to claim 9, wherein the image sensor is configured to image the liquid discharged portion of the liquid discharge head on an outward path and a return path.

* * * * *